May 5, 1942.  S. E. OPPERMAN  2,282,206
SCREW-CUTTING DIE
Filed Aug. 14, 1941

Stanley Edward Opperman,
By Watson E. Coleman.
Attorney.

Patented May 5, 1942

2,282,206

UNITED STATES PATENT OFFICE 2,282,206

SCREW-CUTTING DIE

Stanley Edward Opperman, Greenhill, Ganwick Corner, near Barnet, England

Application August 14, 1941, Serial No. 406,913
In Great Britain July 1, 1940

2 Claims. (Cl. 10—123)

This invention for improvements in screw-cutting dies relates more particularly to dies or tools for screw threading rods of small diameter or wire and has for its object to provide in a die or screw threading tool of simple construction means for ensuring accuracy in the formation of the threads on work which, as indicated, may be of comparatively small diameter.

With known one piece dies it is usually comparatively difficult to ensure that a screw thread is cut symmetrically on a rod for instance, that is to say with the axes of the thread convolutions and of the rod accurately coincident. Moreover, the thread can easily be inaccurately formed with a varying pitch when using one piece dies of known construction without guiding means.

These difficulties are overcome by the invention according to which a screw-cutting die or tool is provided with means for guiding the said die as it traverses the member to be threaded so that the resultant thread is even and symmetrical.

In one simple form of the invention the die proper is formed in a short bar of metal provided with two opposite sets of the usual thread-cutting die teeth separated by throats or clearance spaces for receiving the cuttings, and another similar bar is secured, for instance by stamping, riveting or welding on one face of the first-mentioned bar. This second bar constitutes a guide for the die, and has a hole exactly opposite and coaxial with the die aperture, this hole being of such size that it just fits easily round the rod on which a screw thread is to be cut.

In the accompanying sheet of illustrative drawings

Figure 1:
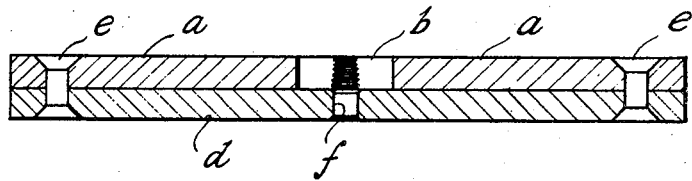
Figure 2:
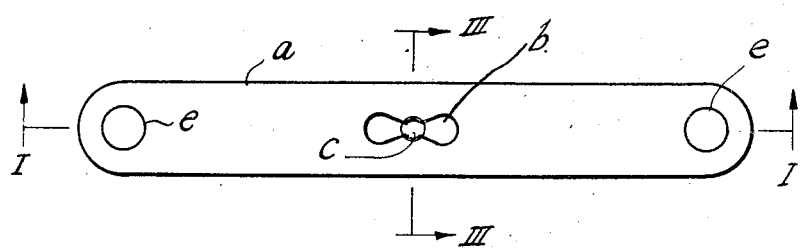
Figure 3:
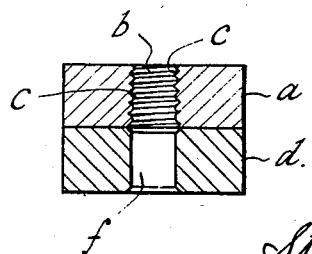

Fig. 1 is a longitudinal vertical section of a screw cutting tool constructed according to this invention, Fig. 2 is a plan of the same, and Fig. 3 is a transverse section taken through the centre of the die at 3—3 Fig. 2.

Referring to the drawing a steel bar $a$ is formed at or about the middle of its length with a slotted aperture $b$, the middle portion of which is of interrupted circular shape comprising two opposite segmental side portions having hardened screw cutting die teeth $c$. At its ends the slotted aperture $b$ is enlarged as shown in Fig. 2 at the throats or clearance spaces of the die to receive the cuttings removed from the work by the die teeth.

A second metal bar $d$ secured as shown by rivets $e$ to the bar $a$ which is superposed thereover, has a guide aperture $f$ for the rod or wire to be screw-threaded and is co-axial with the die aperture proper as aforesaid.

The two bars $a$, $d$, instead of being riveted together as shown may be welded together or otherwise secured, and the outer ends form the handles of the die as will be understood.

In use the rod to be threaded is securely clamped and the end to be threaded is inserted into the hole $f$ in the guide bar. Then the threading operation is carried out in the usual way, the guide bar ensuring that the resultant thread shall be cut correctly on the rod.

The invention is of particular application where the dies are intended for use by amateurs and young workers of little practical skill, in the construction of models for example.

I claim:

1. A screw threading die or tool consisting of a metal bar having a slot-like aperture constricted midway of its ends, screw cutting die teeth on opposite sides of the narrowest part of the aperture, the portions of the aperture on opposite sides of the die teeth forming clearance throats for receiving cuttings, and a second metal bar disposed lengthwise of and secured to the first mentioned bar and formed with a guide aperture alined with the central toothed portion of the aperture to receive the work.

2. A screw threading die consisting of a flat metal bar of substantial length having a longitudinally extending elongated opening constricted midway of its ends, screw thread cutting teeth on opposite edges of the narrowest portion of the opening, the portions of the opening upon the opposite sides of said teeth providing clearance throats for receiving cuttings, and a second flat metal bar of the same width, length and thickness as the first bar disposed against one side face of and paralleling the first bar and secured thereto and having a work guide opening alined with the central threaded part of said elongated opening.

STANLEY EDWARD OPPERMAN.